United States Patent
Geiselhart et al.

(10) Patent No.: US 7,567,972 B2
(45) Date of Patent: Jul. 28, 2009

(54) METHOD AND SYSTEM FOR DATA MINING IN HIGH DIMENSIONAL DATA SPACES

(75) Inventors: Reinhold Geiselhart, Rottenburg-Ergenzingen (DE); Christoph Lingenfelder, Herrenberg (DE); Janna Orechkina, Leipzig (DE)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 10/787,660

(22) Filed: Feb. 26, 2004

(65) Prior Publication Data

US 2004/0225638 A1    Nov. 11, 2004

(30) Foreign Application Priority Data

May 8, 2003    (EP) .................................. 03101276

(51) Int. Cl.
G06F 7/00    (2006.01)
G06F 17/00    (2006.01)

(52) U.S. Cl. ........................................... 707/101; 707/2
(58) Field of Classification Search ........................ None
See application file for complete search history.

(56) References Cited

U.S. PATENT DOCUMENTS 6,636,847 B1 * 10/2003 Spires ............................ 707/3
7,130,807 B1 * 10/2006 Mikurak ......................... 705/7
2004/0068514 A1 * 4/2004 Chundi et al. ............... 707/102
2005/0171948 A1 * 8/2005 Knight .......................... 707/6

* cited by examiner

Primary Examiner—Luke S. Wassum
Assistant Examiner—Michael J Hicks
(74) Attorney, Agent, or Firm—Yee & Associates, P.C.; David A. Mims

(57) ABSTRACT

A computerized method and system for analyzing a multitude of items in a high dimensional (n-dimensional) data space $D_n$ each described by n item features. The method uses a mining function f with at least one control parameter $P_i$ controlling the target of the data mining function. The method selects a transformation function T for reducing dimensions of the n-dimensional space by space-filling curves mapping said n-dimensional space to a m-dimensional space (m<n). The method determines a transformed control parameter $P^T_i$ controlling the target of the data mining function in the m-dimensional space. The method applies the selected transformation function T on the multitude $D_n$ of items to create a transformed multitude $D_m$ of items, executes the mining function f controlled by the transformed control parameter $P^T_i$ on the transformed multitude of items $D_m$, and stores the result.

11 Claims, 17 Drawing Sheets target dimension:

reads "Washington Post"

reads "U.S.A. Today"

METHOD AND SYSTEM FOR DATA MINING IN HIGH DIMENSIONAL DATA SPACES

1. BACKGROUND OF THE INVENTION

1.1 Field of the Invention

The present invention relates generally to the technical field of data mining and/or text mining. More particularly the current invention is suggesting mining technology to improve the performance and scalability in data spaces with a large number of dimensions.

1.2 Description and Disadvantages of Prior Art

Data mining and text mining (collectively referred to as data mining in the following) in its most fundamental meaning addresses the problem of looking at authentic information from different directions and thereby gathering derived information. This "information about information" (meta-information) is often not obvious, but it opens new horizons because it helps to abstract from the plain data and see the "big picture" from a higher level.

Data mining is usually dealing with high dimensional data. Each item or data member consists of n attributes or features that characterize and specify the individual data item in more detail. If, for example, we are analyzing meteorological data sets, then each data item could be a cube of air in stratosphere that owns n features such as temperature, humidity or pressure. Each feature is called a variable and any algorithm that allows for data mining has to deal with a multitude of variables simultaneously. The goal is to discover interesting patterns in such an n-dimensional data set. "Interesting" in this context is defined by a data mining function (e.g. clustering, classification, regression, . . . ) and a set of control parameters. In particular these control parameters are used to specify properties of the mining result, to tailor the algorithmic procedure or in general to control the mining target of the data mining function. The original amount of data on which data mining operates is typically huge, as it usually describes a complex environment. As a result, new methods have been developed to keep the handling of such immense data efficient in terms of performance, usage of resources such as computer storage as well as scalability of the applied mining technology with the increasing number of dimensions of the underlying data spaces.

Prior art data mining on high-dimensional information is performed with algorithms and mining technology that work in n-dimensional space. While the performance of these algorithms is acceptable with few dimensions, they do not scale well with many or even large number of dimensions. To overcome this limitation of data mining in high dimensional data spaces, several strategies have been developed.

One possible proposed solution is to reduce high dimensionality by dropping those dimensions that are supposed to play a minor role in the following analysis step. This method is most often performed on a "best guess" basis as it intentionally drops information without knowing the exact impact on the final result. Another disadvantage of this approach is the need for human intervention for selecting the most relevant dimensions, i.e. features.

It has also been tried to capture most of the information by defining a new set of (derived) variables, such that some of the new variables hold most information while others contribute only little and can therefore be neglected (Principal Component Analysis, PCA). Often, however, the number of variables is still too large or the loss of information too big in order to be regarded as a practical approach.

In another approach specific algorithms and methods have been developed that are tailored to a specific problem in high dimensional space. In this case, special assumptions about the data can allow efficient processing, but with any other problem, where these assumptions do not hold, the algorithm will not work.

1.2 OBJECTIVE OF THE INVENTION

The invention is thus based on the objective to improve the performance and scalability of data mining technology in data spaces with a large number of dimensions. At the same time it is a further objective to improve the quality of the mining results.

2. SUMMARY AND ADVANTAGES OF THE INVENTION

The objectives of the invention are solved by the independent claims. Further advantageous arrangements and embodiments of the invention are set forth in the respective subclaims.

The present invention proposes a computerized method and system for analyzing a multitude of items in a high dimensional (n-dimensional) data space $D_n$ each described by n item features. The method uses a mining function f with at least one control parameter $P_i$ controlling the target of the data mining function.

A first step is selecting a transformation function T for reducing dimensions of the n-dimensional space by means of space-filling curves mapping said n-dimensional space to a m-dimensional space (m<n).

A second step is determining a transformed control parameter $P^T_i$ controlling the target of the data mining function in the m-dimensional space.

A third step is applying the selected transformation function T on the multitude $D_n$ of items to create a transformed multitude $D_m$ of items and is executing the mining function f controlled by the transformed control parameter $P^T_i$ on the transformed multitude of items $D_m$.

According to a first fundamental observation of the current invention the number of dimensions can be significantly reduced by applying the technique of space-filling curves. As this technique allows to reduce the number of dimensions n to any required degree m performance and scalability of data mining technology is improved significantly. It is important to be pointed out that this approach avoids that information in certain dimensions of the data space is lost during the reduction process; the transformation process using space-filling curves guarantees that all information within the n-dimensional data space is mapped onto and maintained in the reduced m-dimensional data space. This property of the current invention is in clear contrast to prior art teachings discussed above.

It is a further fundamental observation of the current invention that after reduction of dimensions of the data space it is most important not to use the control parameters controlling the target of the data mining functions within the n-dimensional data space directly; instead transformed control parameters have to be determined which control the data mining function within the reduced m-dimensional data space.

It is the proper combination of both fundamental observations which finally not only improve performance and scalability but also quality of the mining results.

3. BRIEF DESCRIPTION OF THE DRAWINGS

Figure 4:
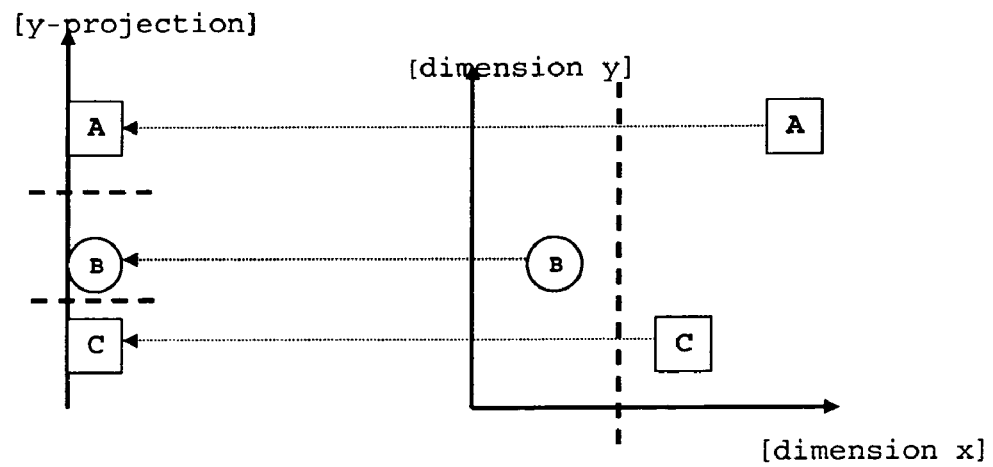

FIG. 4 demonstrates that y-projection needs more steps than in higher dimension.

Figure 5:
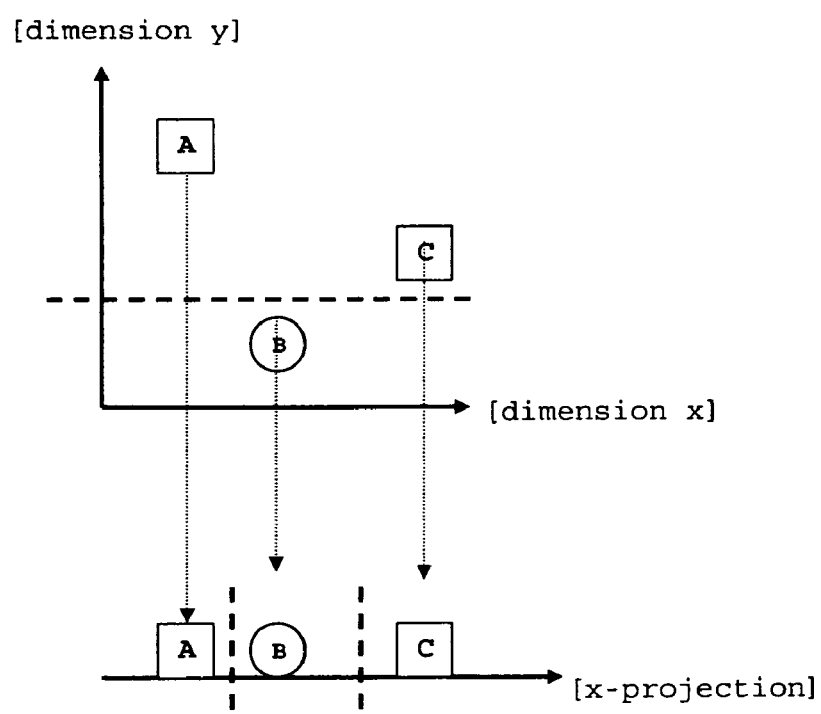

FIG. 5 demonstrates that x-projection needs more steps than in higher dimension.

Figure 6:
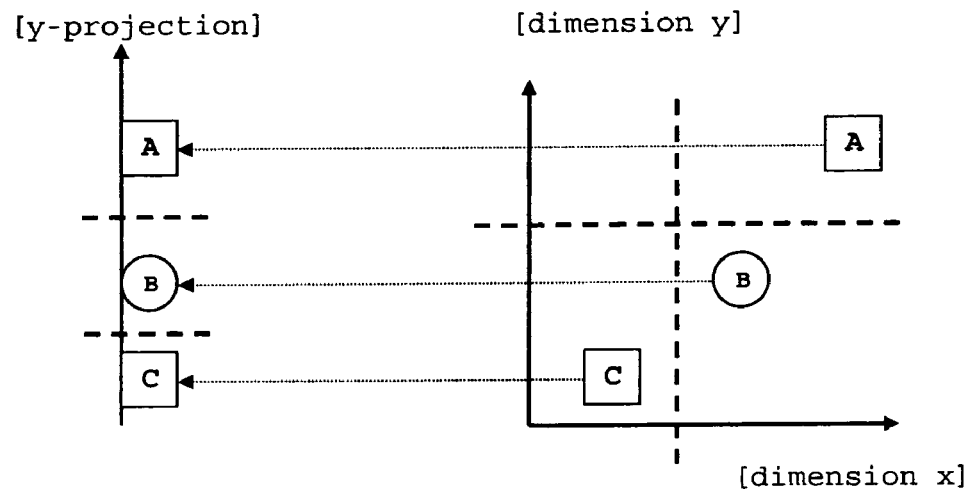

FIG. 6 demonstrates that projection on y needs two steps.

Figure 7:
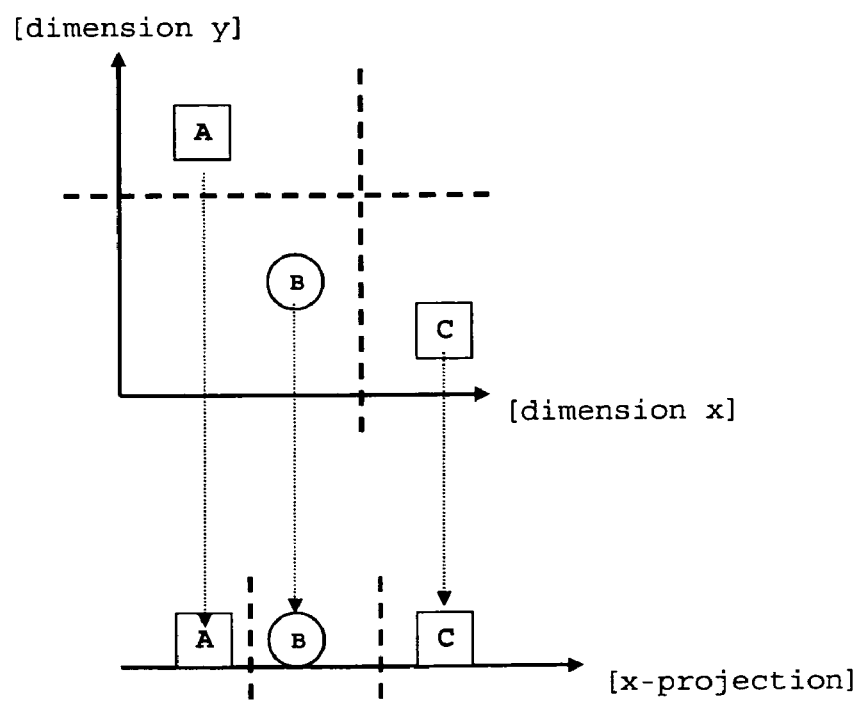

FIG. 7 demonstrates that projection on x needs two steps.

Figure 8:
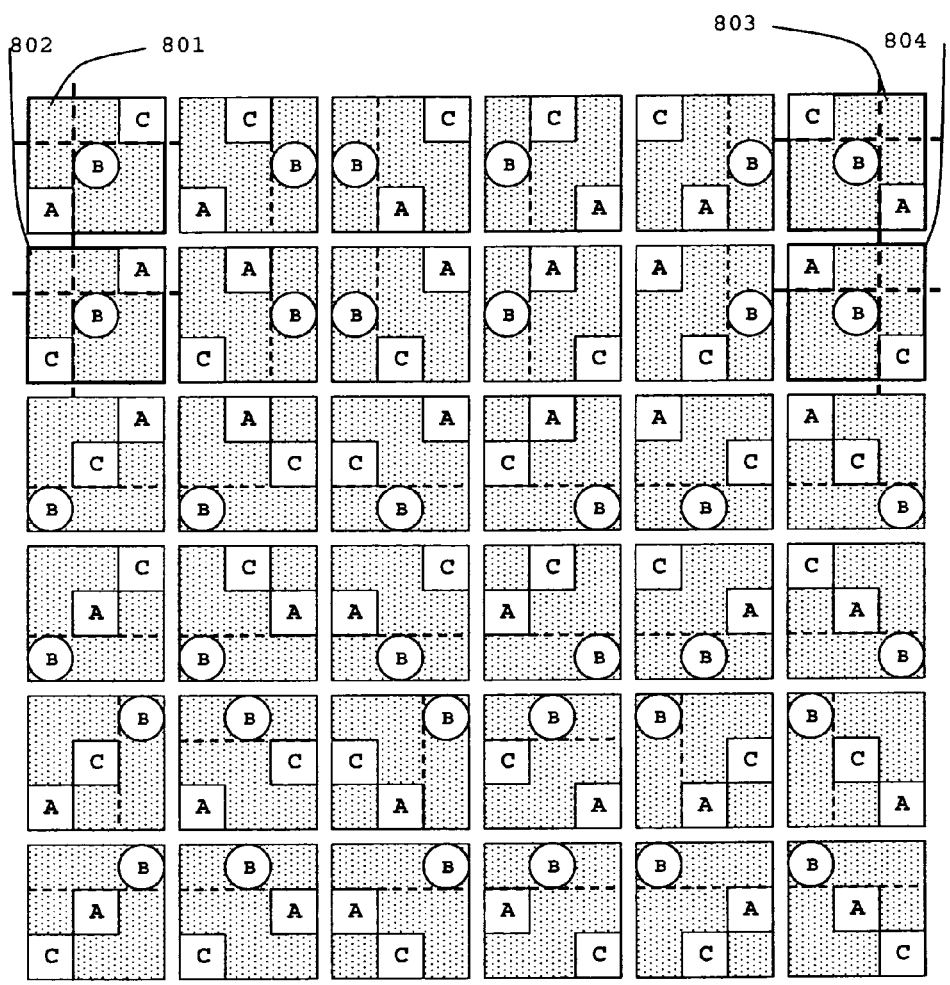

FIG. 8 illustrates that in two dimensions there are 36 variations, four of which cannot be completely separated in one step.

Figure 9:
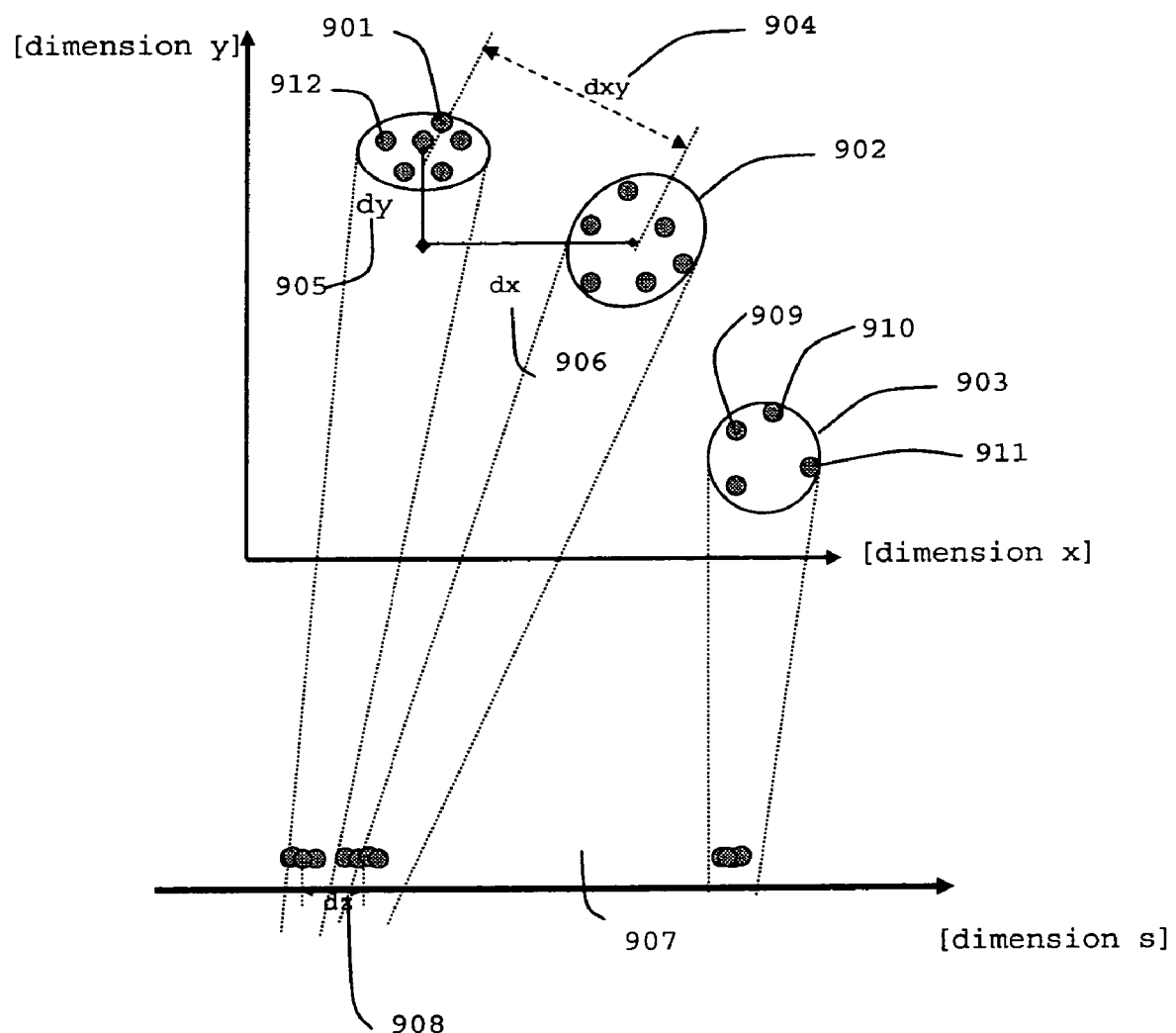

FIG. 9 illustrates that the change of a geometric property is non-trivial when dimensions are transformed.

Figure 10:
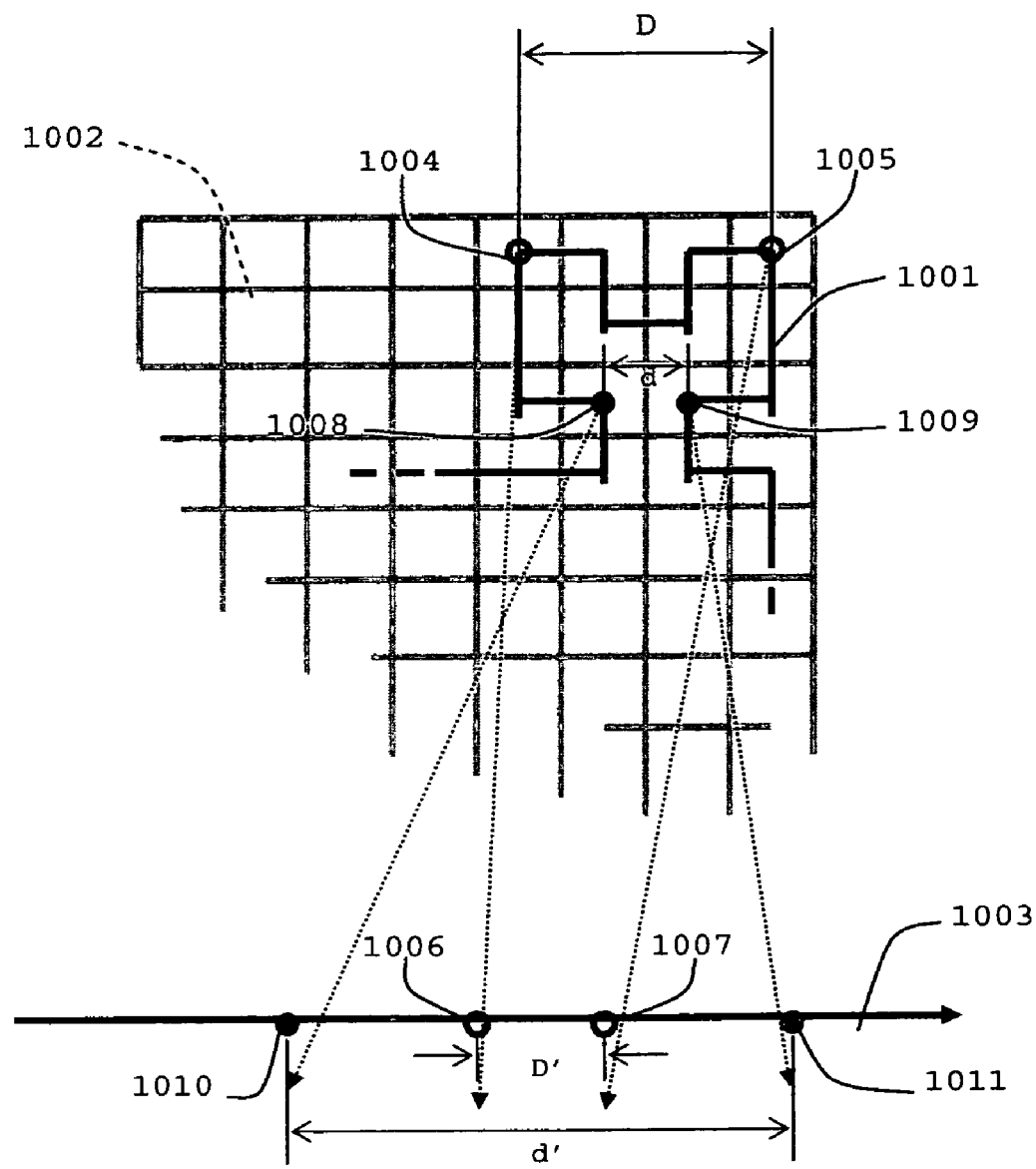

FIG. 10 illustrates that a small parallel shift in location causes inverse distance relations after transformation.

Figure 11:
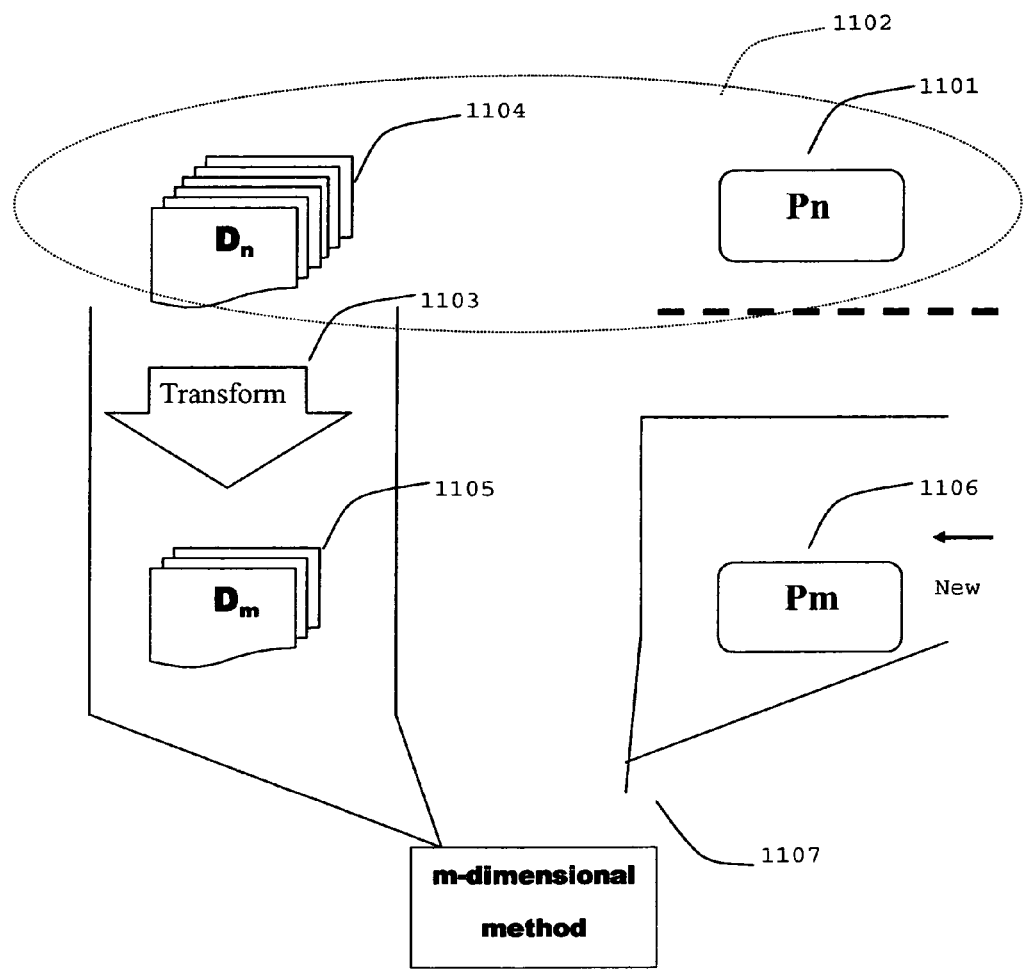

FIG. 11 shows dimension reduction without control parameter adaptation.

Figure 12:
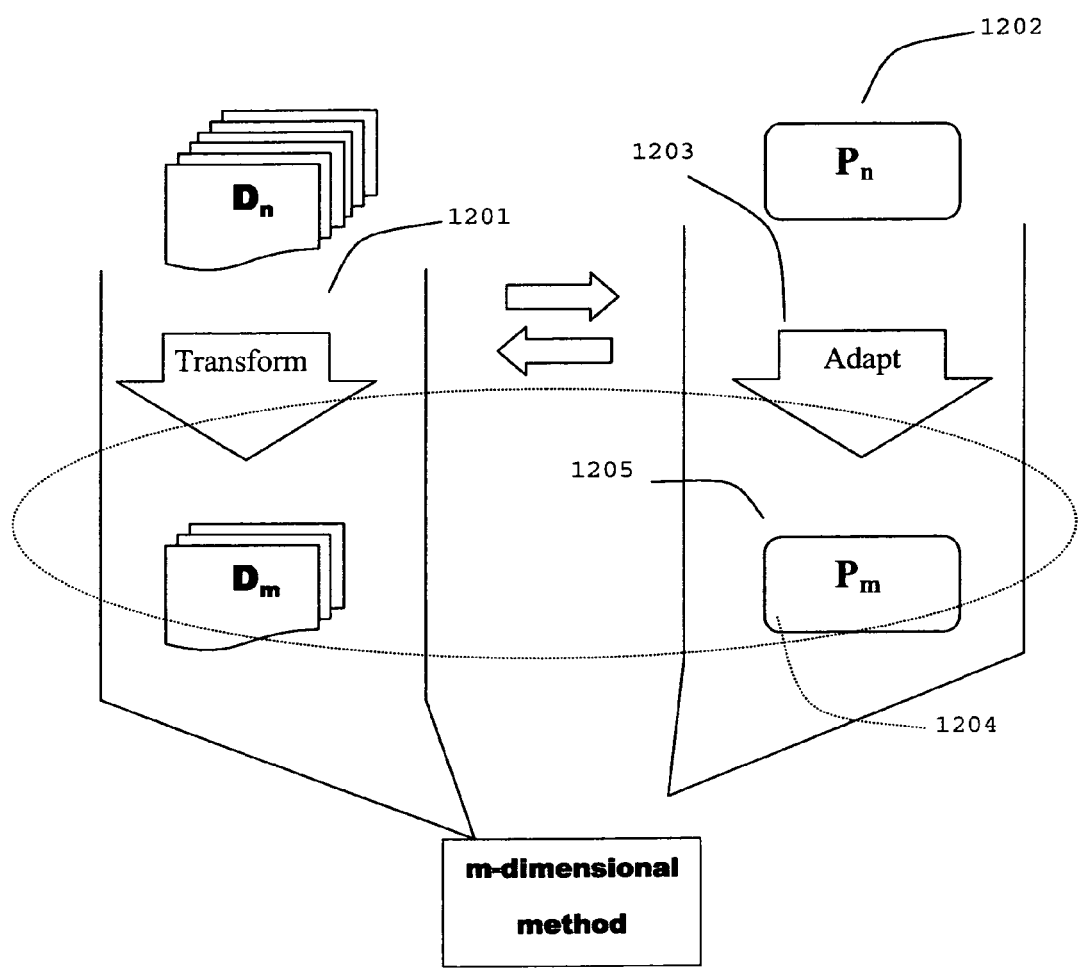

FIG. 12 illustrates dimension reduction approach with control parameter adaptation.

Figure 13:
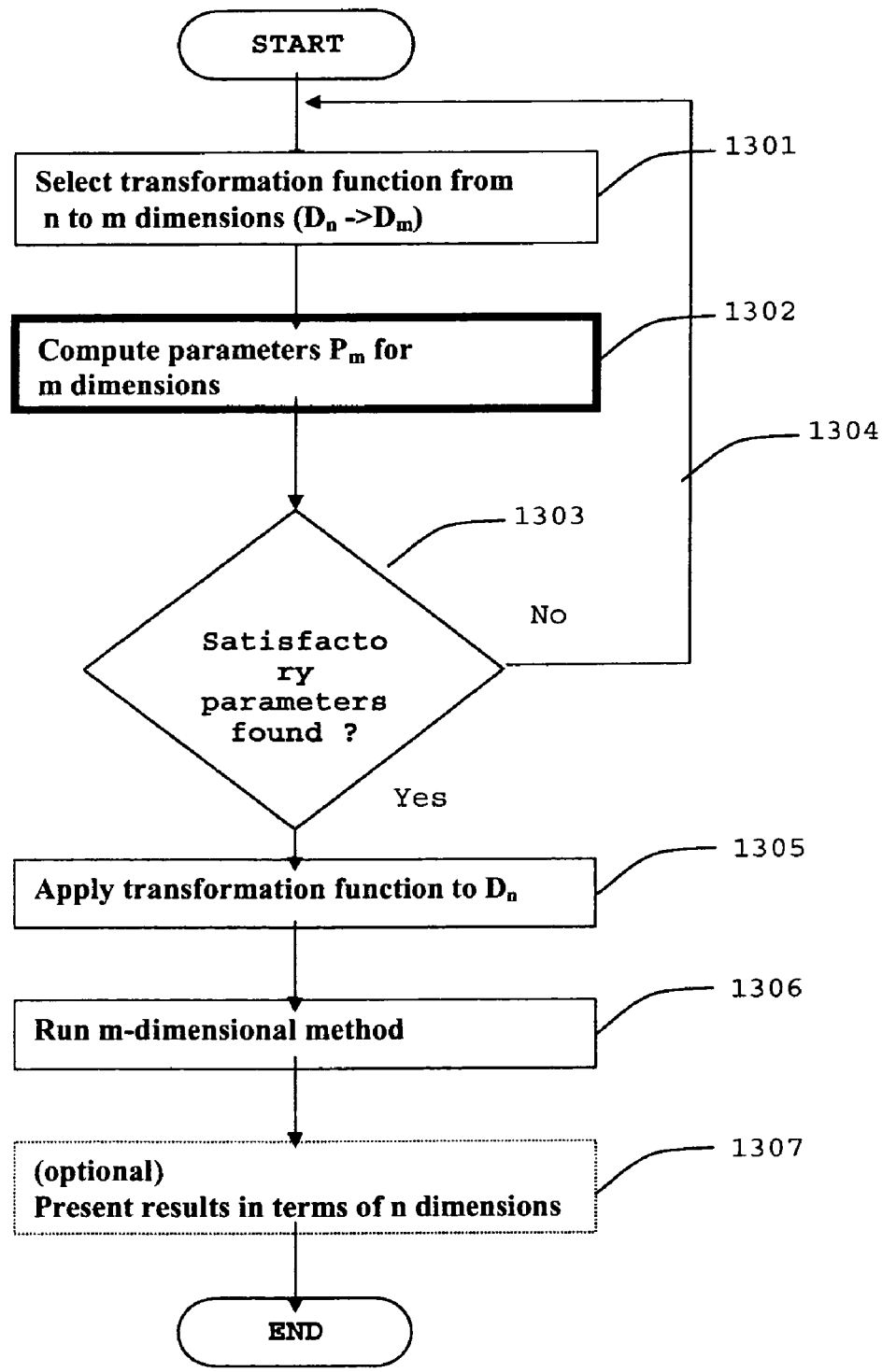

FIG. 13 is a flow diagram that shows how the invention works in general.

Figure 14:
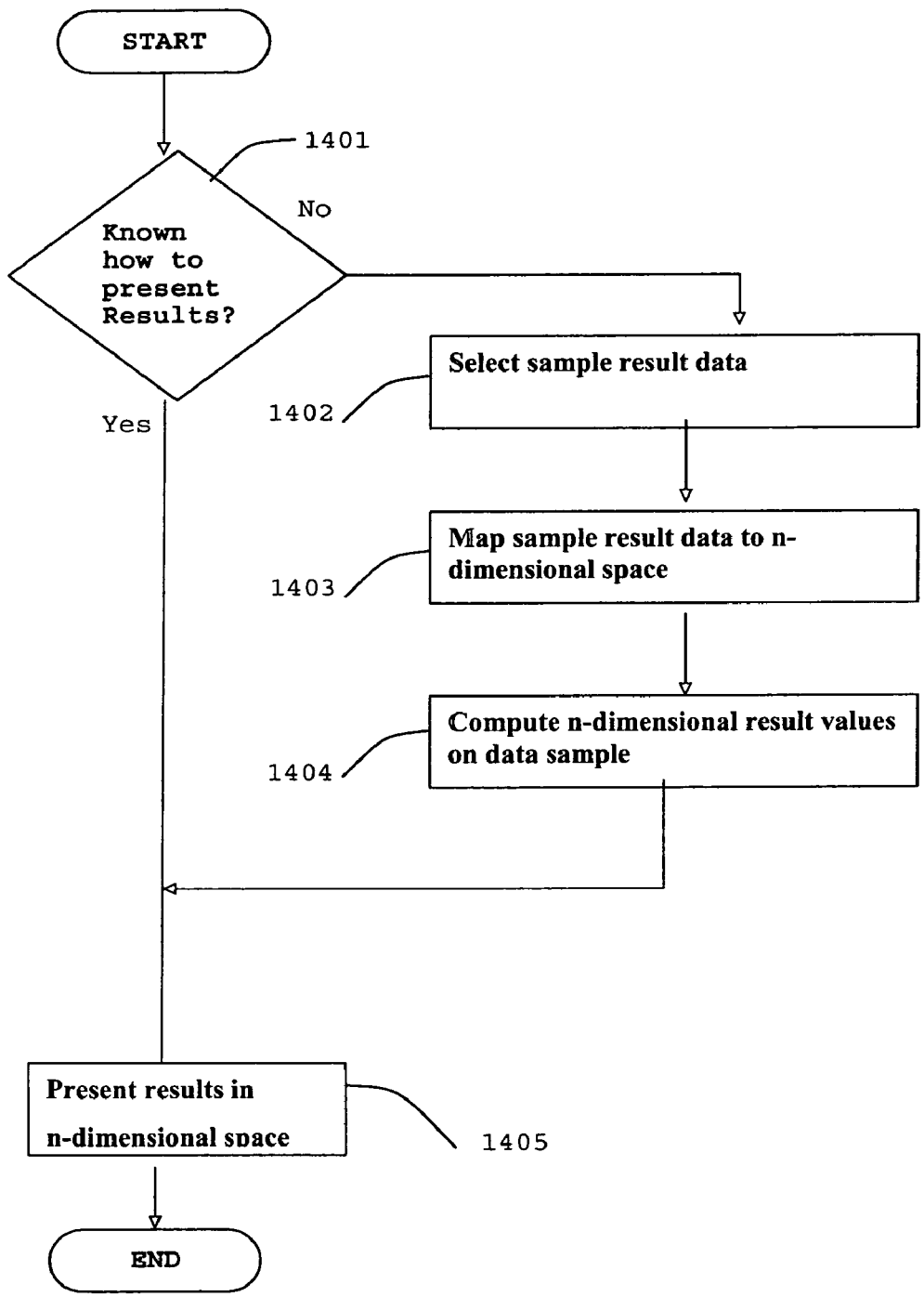

FIG. 14 is a flow diagram that shows how to present results in terms of n dimensions.

Figure 15:
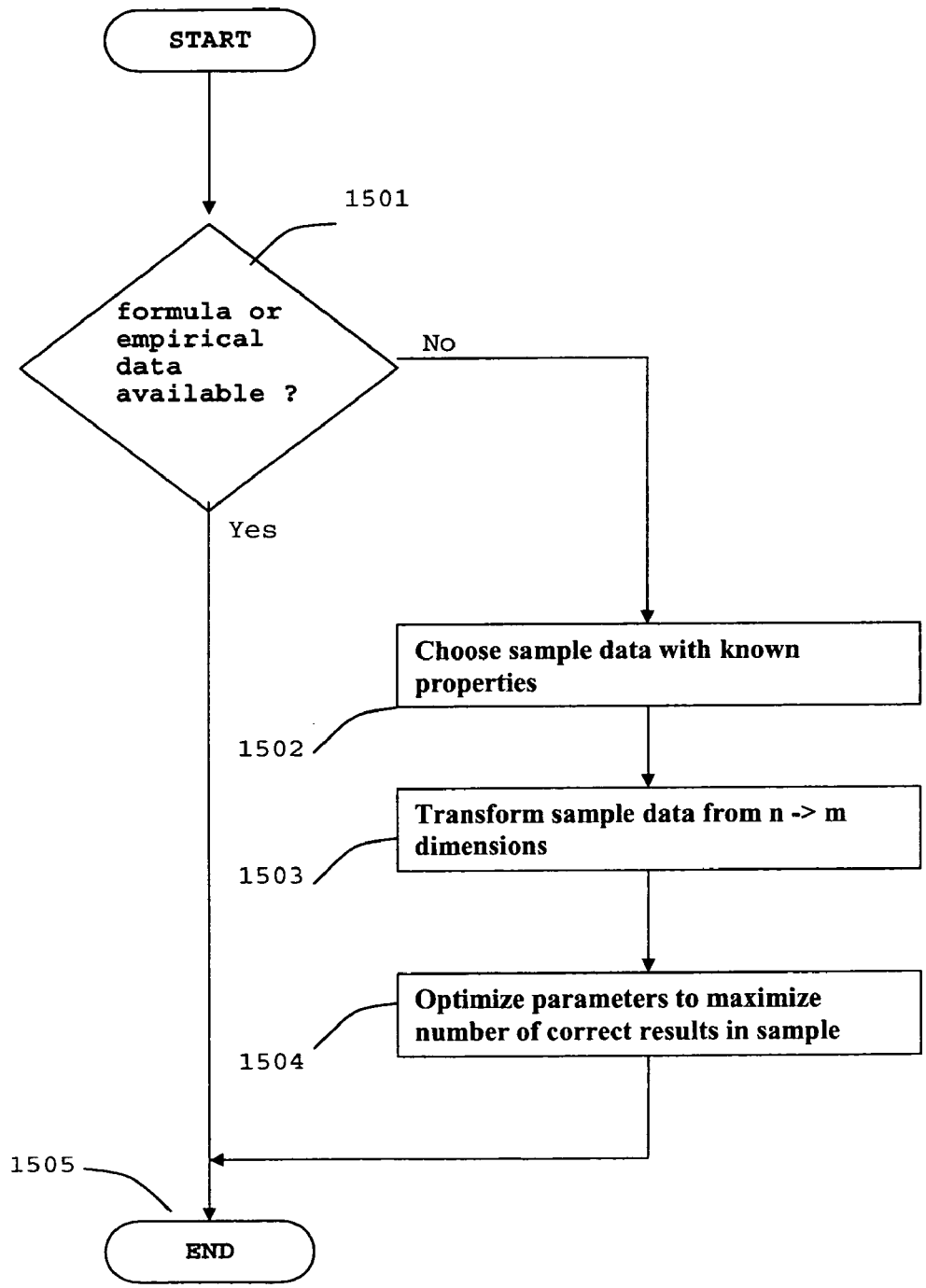

FIG. 15 illustrates the adaptation of control parameters.

Figure 16:
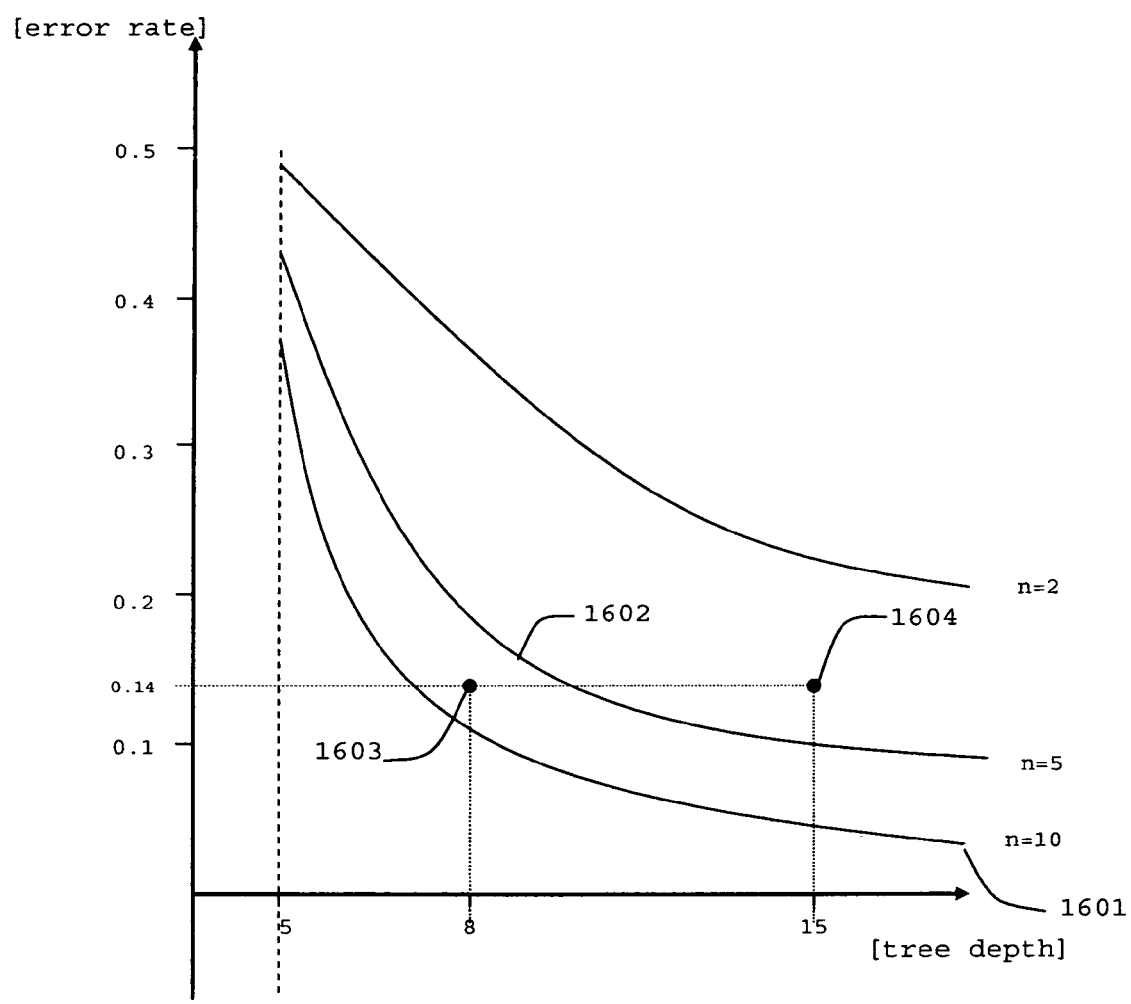

FIG. 16 illustrates the error rate as a function of tree depth for fixed data dimension n.

Figure 17:
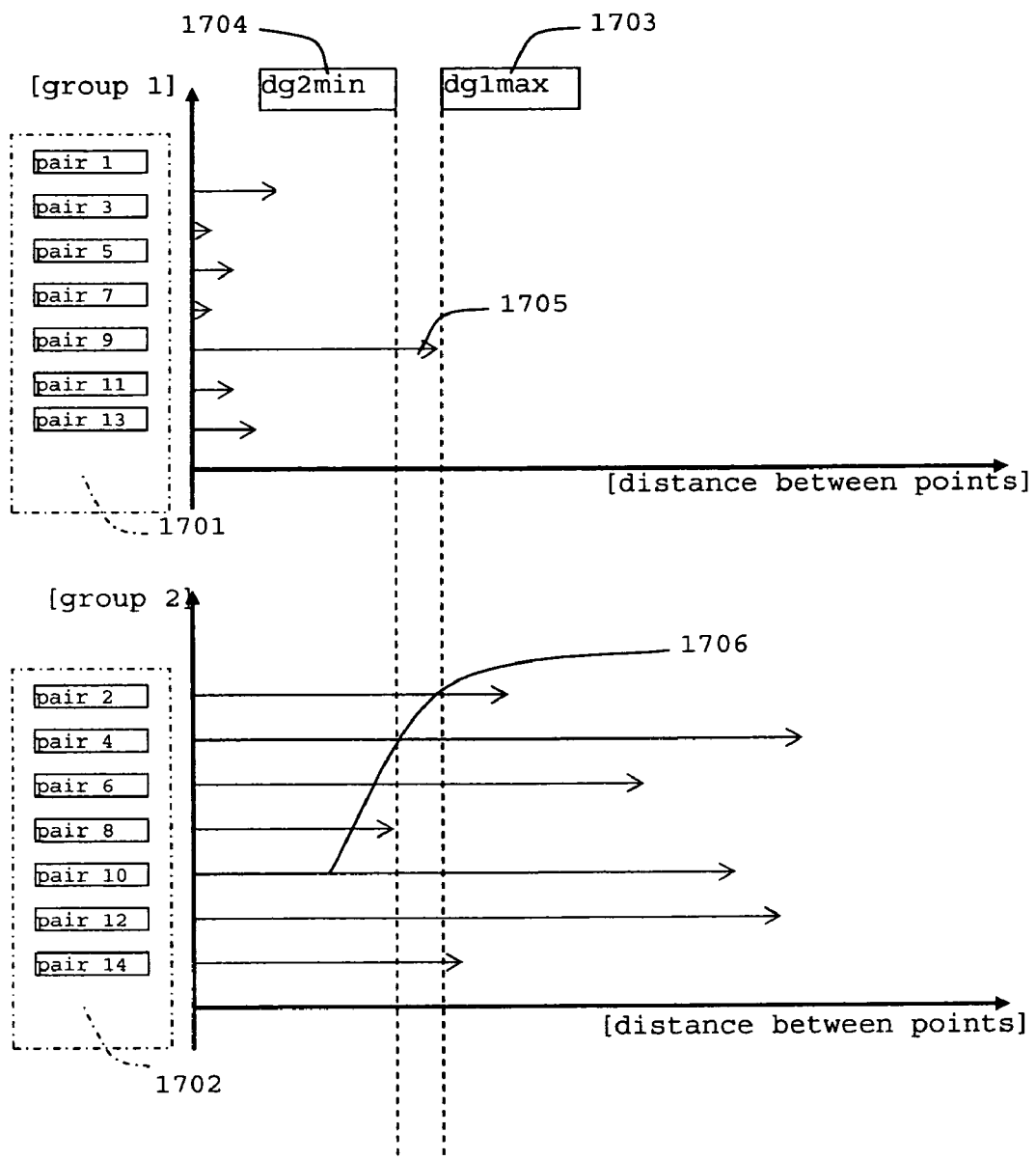

FIG. 17 illustrates an example of how a new control parameter value for cluster distance is found based on sample data that has been transformed from two-dimensional space to one dimension.

Figure 18:
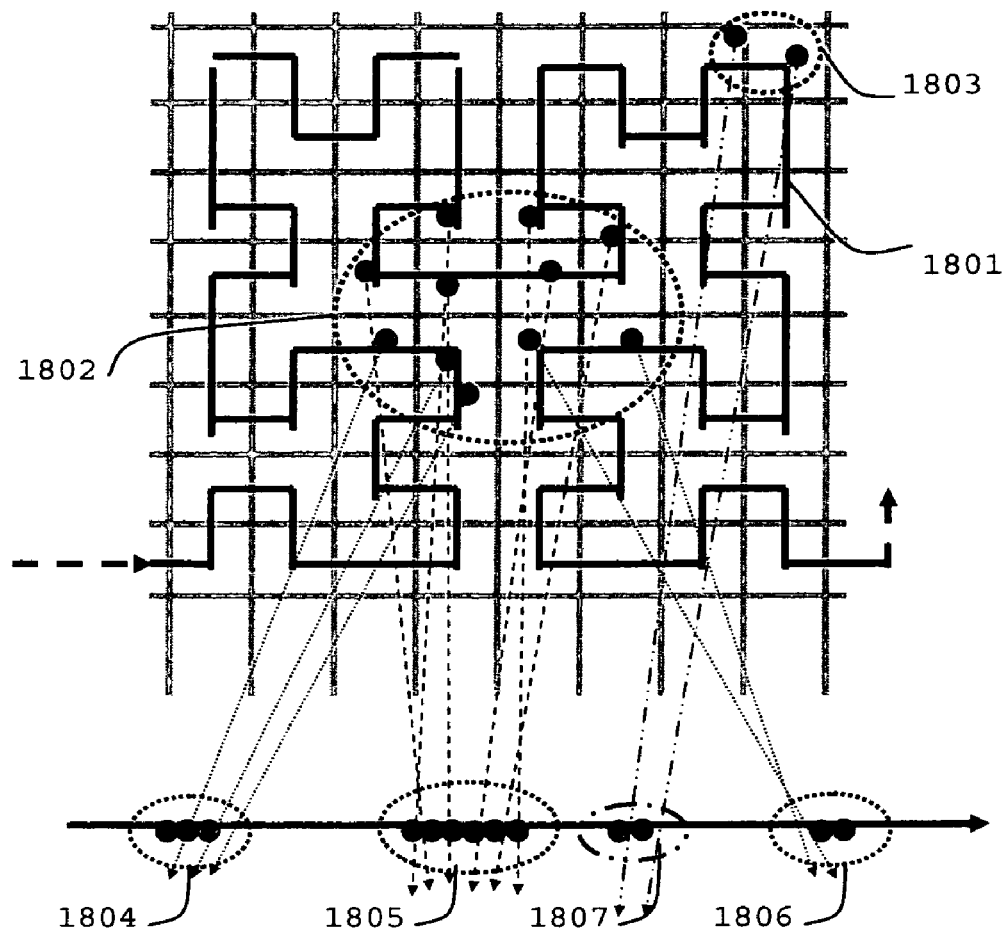

FIG. 18 illustrates a situation where locality of space-filling curves is not preserved and leads to an unacceptable error rate.

Figure 19:
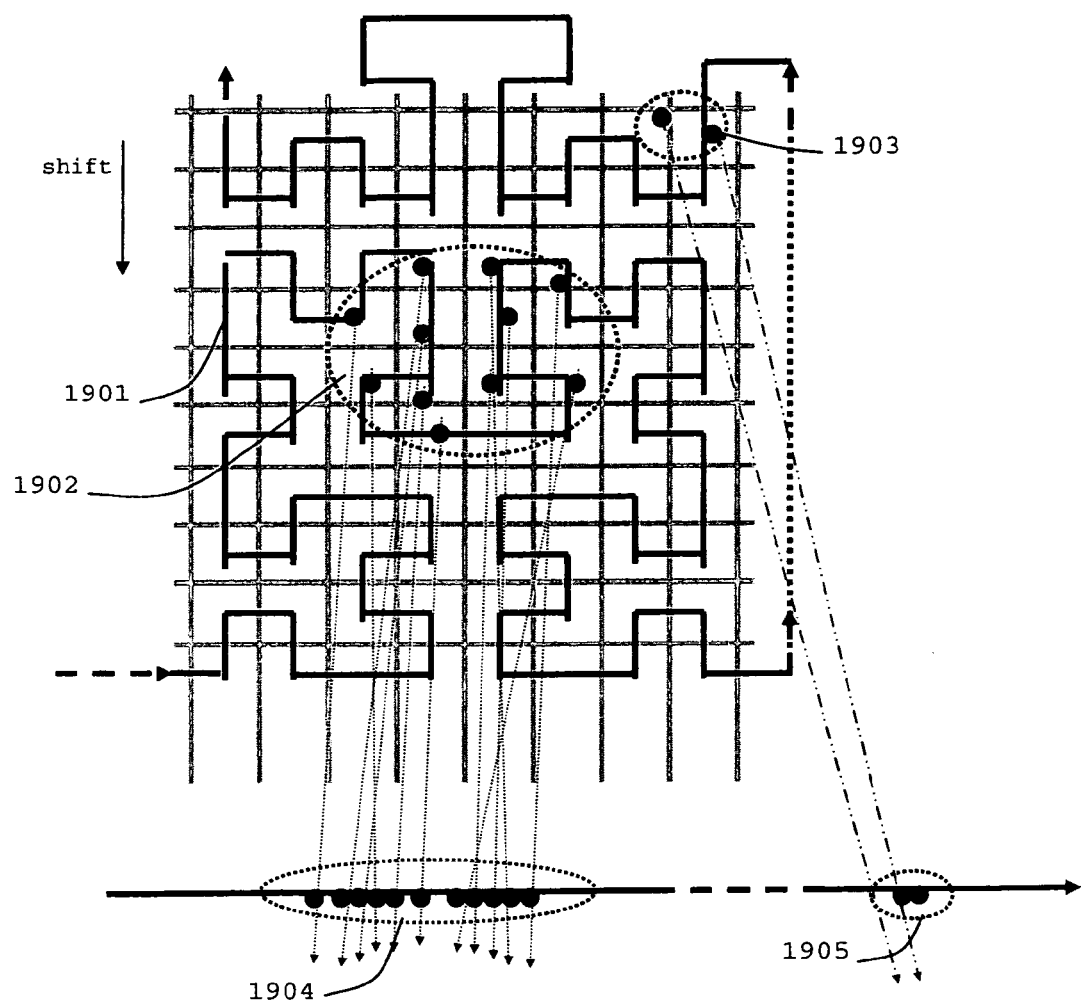

FIG. 19 illustrates an example how error rate can be improved by modification of transformation properties of space-filling curve.

4. DESCRIPTION OF THE PREFERRED EMBODIMENT

In the drawings and specification there has been set forth a preferred embodiment of the invention and, although specific terms are used, the description thus given uses terminology in a generic and descriptive sense only and not for purposes of limitation. It will, however, be evident that various modifications and changes may be made thereto without departing from the broader spirit and scope of the invention as set forth in the appended claims.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

4.1 Introduction and Fundamental Observations

Figure 1:
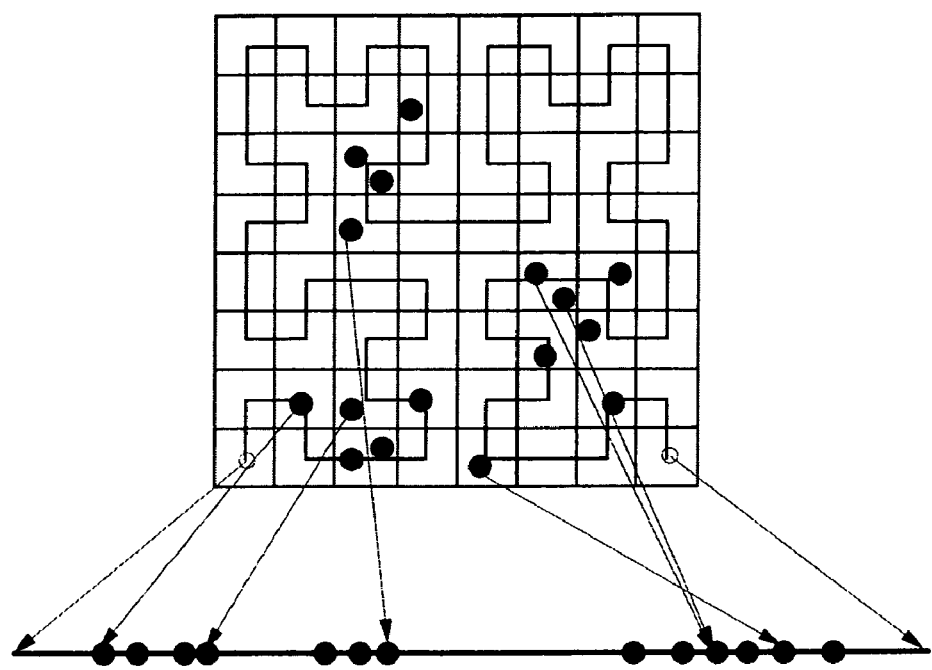
FIG. 1 illustrates the transformation of data points from n-dimensional space to a one-dimensional interval by means of a space-filling curve.

Peano introduced Space-Filling Curves (SFC) in 1890. It has been known that this is a way to reduce multidimensionality to one dimension. Peano mapped a unit interval to a unit square and later it has been shown that it is possible to map a one-dimensional line onto a two-dimensional area in a definite, reversible way. FIG. 1 shows such a mapping based on a space-filling curve defined by Hilbert. Points in a two-dimensional area are mapped to a one-dimensional interval. Of course, the same is possible for an arbitrary number of dimensions. An important property of space-filling curves is "locality": most pairs of points in n-dimensional space will maintain their proximity. Or, in other words, data points that are "near" to one another in n-dimensional space will also be "near" to one another in one dimension.

In more general terms space-filling curve technology performs a transformation between an interval and a d-dimensional bounded space resulting in substantial compression of the information and retaining some of the spatially associative properties of the space. This transformation has the property that points which are close in d-dimensional space are not necessarily images of "neighboring" points in the unit interval, but the converse is true, i.e. points which are close to each other in the unit interval are mapped on to points close together in the hyperspace. The one-to-one correspondence is defined between elementary regions in the multidimensional space and intervals in such a way that neighboring elementary intervals have corresponding multidimensional elementary regions that are neighboring.

According to a first fundamental observation of the current invention the technology of space-filling curves (SFC) can be applied to data mining problems such as clustering or classification. According to this observation the number of dimensions can be significantly reduced by applying this technique of space-filling curves to reduce the number of dimensions n of the data space to any required degree, i.e. to a m-dimensional data space.

Of course, the mapping can be combined with other common methods such as data pre-processing. Further the resolution of the SFC need not be fixed across or within the original dimensions, which may lead to additional performance benefits.

Unfortunately, simply applying the space-filling curve or any other dimension reduction approach is often not sufficient to solve the described problems of data mining. On the contrary, new problems occur. Even a transformation of data with relatively low dimensionality results in a distribution in fewer dimensions that has little in common with the distribution of the original data in n dimensions.

Figure 2:
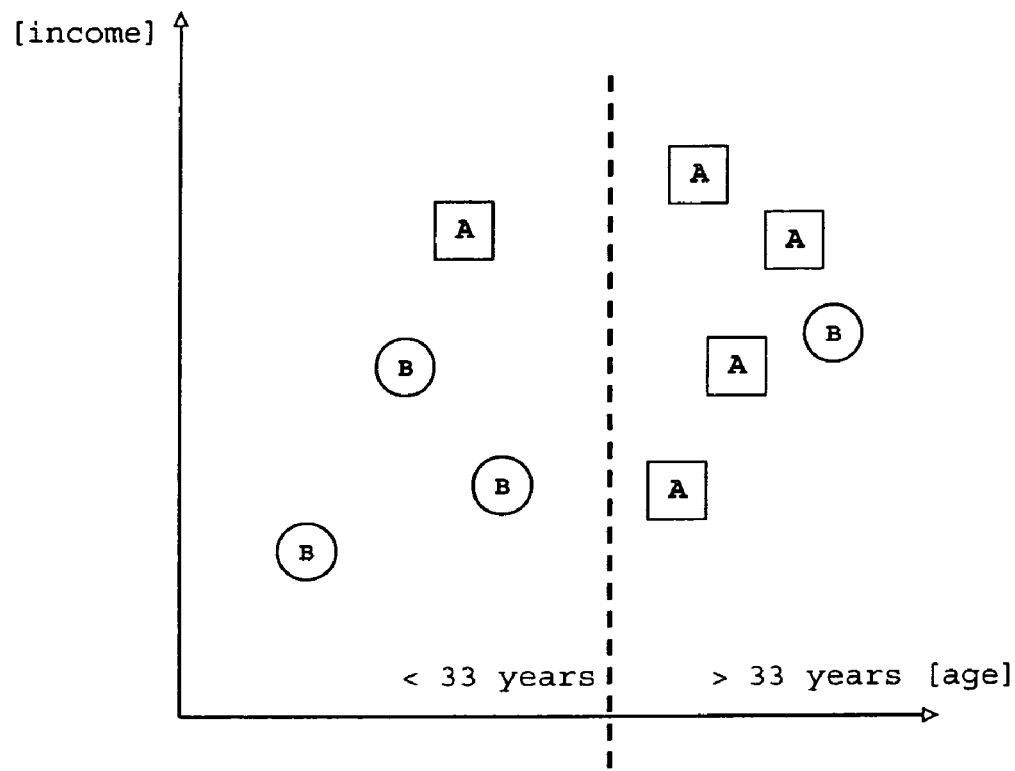
FIG. 2 illustrates the separation of data according to their class (reading preferences) using dimension "age" and discriminatory value 35.
Figure 2:
Figure 2:
Figure 3:
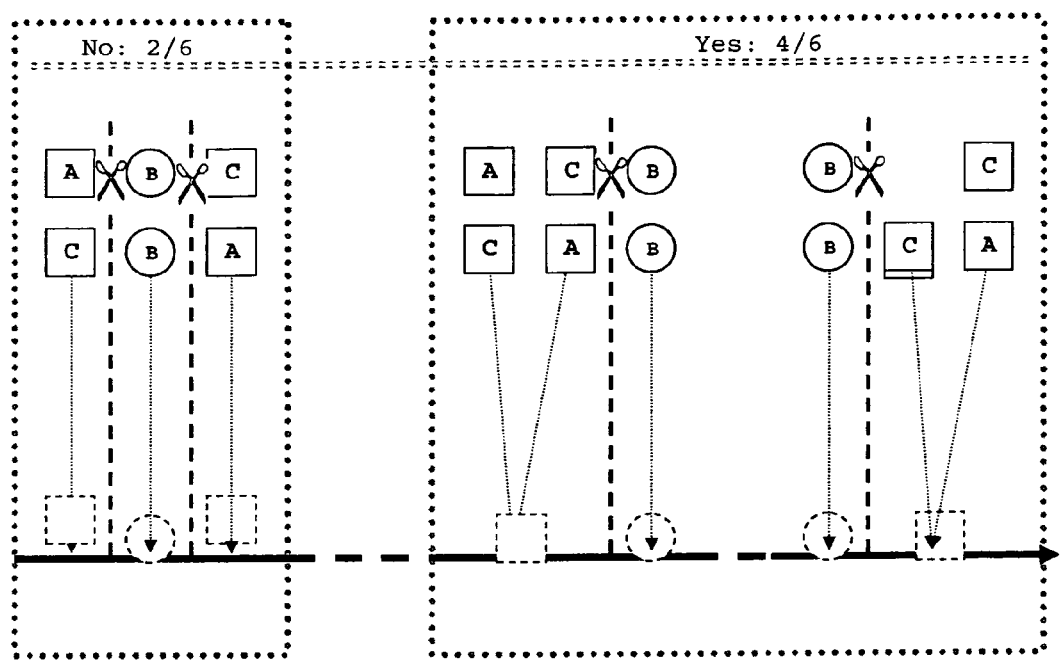
FIG. 3 illustrates a class separation of three records in one dimension.

Consider the search for a classification model using a decision tree algorithm. If the user originally, i.e. for the n-dimensional problem, specifies a maximal tree depth (as control parameter controlling the target of the data mining function) that, based on his domain knowledge, should lead to sufficient prediction accuracy, this tree depth will in general fail to work in the transformed lower-dimensional problem. The decision tree algorithm repeatedly divides data records into subsets such that each subset will contain a large proportion of records with identical target class. Selecting a dimension and a dividing-value as depicted in FIG. 2 does this. The probability of finding a good split decreases with the number of dimensions. In a simple example with just three data records A, B and C (FIG. 3), we enumerate all the six possible arrangements with respect to one dimension s. We see that in two out of the six possible arrangements a perfect split is impossible in a single step. Assume that the squares represent records of class "reads Washington Post" and circles indicate class "reads U.S.A. Today" as in FIG. 2. The symbols with dashed lines represent the classes that are assigned to records on the corresponding side of the cutting line.

FIG. 5 shows that even if a single cut in one dimension (dimension x) is not possible, there is some likelihood that a single cut is possible if additional dimensions are available (see dimension y in FIG. 5). FIG. 4 shows the same situation with reversed dimensions. This is due to the wider choice of split criteria. Even for three records in two dimensions two steps may be necessary, but these are less frequent than in one dimension. For two examples see FIGS. 6 and 7. In total, three records can be arranged in 36 different ways in two dimensions, only four of which cannot be split immediately (see 801 to 804 in FIG. 8). So, in this example, the likelihood of a successful split decreases from 89% to 67%. This effect further increases if the dimension reduction gets bigger. Therefore larger tree depths are necessary in order to match the splitting power of the tree.

As a second example, if a minimum cluster distance d (as control parameter controlling the target of the data mining function within the original n-dimensional data space) has been selected, this value cannot simply be used in a lower-dimensional problem. It is not even sufficient to use a simple formula to adapt the distance to the new dimensionality. In the context of a space-filling curve mapping, simply moving a pair of data records without changing their relative distance changes their distance in one dimension. This phenomenon can be seen in FIG. 10 (which will be discussed in more detail below).

So a user's domain knowledge is only directly helpful for analysis in the original n-dimensional domain. As soon as dimensions are reduced (data is transformed), any user input provided in the form of control parameters controlling the target of a data-mining algorithm will lose its significance especially as the difference in dimensions increases.

Preceding examples give rise to a second fundamental observation of the current invention: after reduction of dimensions of the data space it is most important not to use the control parameters controlling the target of the data mining functions within the n-dimensional data space directly; instead transformed control parameters have to be determined which control the data mining function within the reduced m-dimensional data space.

An initial solution approach to the objective of the current invention simply based on the first fundamental observation is depicted in FIG. 11. According to FIG. 11 the original control parameters 1101 ($P_n$) specified for the n-dimensional problem 1102 when it transforms 1103 n-dimensional data 1104 to m-dimensional data 1105 are not adapted. If the control parameters relating to the n-dimensional data space are used also to guide 1106 the data mining function within the reduced m-dimensional data space, the current experience shows that often the quality of the mining results are not satisfactory.

4.2 Basic Solution Concept

Exploiting the fundamental observations given above we assume that an n-dimensional data mining problem is transformed in order to reduce the number of dimensions to achieve performance benefits by means of the technology of space-filling curves. Most user specified control parameters $P_n$ that are input to control the target of the data mining function for the original problem will make no sense in the transformed m-dimensional problem (m<n), especially if the difference in dimensions is large.

The quality of the models generated by an algorithm in m dimensions increases if suitable control parameter values for the m-dimensional algorithm can be derived from the known set of control parameters in n dimensions. Such input parameters serve two purposes. They can either add to the exact definition of the problem, or they can aid the algorithm in its search. Examples for the first type include a minimal distance between clusters, which governs the level of detail in the clustering model. The second type of parameter will not alter the nature of the model but its accuracy, as does for instance the maximum depth parameter in a decision tree algorithm for classification.

FIG. 12 shows, how parallel to the transformation 1201 of the data, the control parameters 1202 are also adapted in 1203 to the lower-dimensional problem 1204. In general, the mapping of an m-dimensional control parameter P 1205 will be governed by $$P = f(p_1, p_2, \ldots, p_k, D_n, T, n, m) \quad (1)$$

Where $p_i$ control parameter for n-dimensional algorithm (controlling the target of the data mining function); examples: minimal clusters distance, maximum depth of classification decision tree, ...

$D_n$ data in n-dimensional space

T transformation function for dimension reduction from m to n

In some cases, it is possible to map a control parameter by applying a formula that is independent of the data or by determining its value using empirical results from measurements. If such a formula is unknown or extensive measurements are unfeasible, we propose to find the mapping function using an iterative learning/optimization approach.

Finally, re-mapping the model representation from low dimensional space back to n-dimensional space allows the user to understand the findings in a context they are familiar with.

The advantage of this approach is to allow the user to formulate all control parameters in a familiar context while still profiting from the performance improvements.

4.3 Solution Concept Applied to a Clustering Problem

Given is an n-dimensional data-mining problem. In the preferred embodiment we employ space-filling curves as the mechanism to reduce the original n dimensions to one dimension (representing the most extreme reduction with m=1). In a simple two-dimensional example we select a Hilbert space-filling curve as data transformation mechanism from two-dimensional space to one-dimensional space to show the advantages of the invention. According to an observation of the current invention the class of Hilbert space-filling curves achieves the best data mining results compared to other classes of space-filling curves.

Let's assume that the data points in our two-dimensional example are distributed as shown in FIG. 9. A clustering algorithm will find the three clusters 901, 902 and 903 if the two-dimensional control parameter "minimal cluster distance" $P_{cd}$ is set to a value smaller than $d_{xy}$ (904). The control parameter $P_{cd}$ is the minimum Euclidian distance $d_{xy}=\mathrm{SQRT}(d_x^2+d_y^2)$ (905-906) that two distinct clusters must have.

Next, we select a Hilbert type of space-filling curve to transform two-dimensional data into one-dimension as shown in 907. The one-dimensional clustering algorithm cannot work with the original value of control parameter $P_{cd}$.

This is due to the nature of the data transformation from two dimensions to one dimension and depends on several factors such as the transformation resolution and geometric anomalies. In one-dimensional space 907 the new value $P_{cd-1}$ must even be smaller than $d_z$ (908), and if we use the old value $P_{cd-2}$ for the one-dimensional algorithm, then we will discover only two clusters instead of three.

The way to determine appropriate parameter values for the target dimension is shown in FIG. 13 in several steps and will be explained next by means of the two-dimensional clustering example.

In the preferred embodiment we select a space-filling curve according to Hilbert as the transformation function to transform n-dimensional data into one-dimensional data. Note that in 1301 the transformation itself is not performed yet, only the transformation function is selected.

After the transformation function has been selected and the amount of dimension reduction is known, the important step of control parameter adaptation has to be done: the computation of the new control parameters $P_m$ for the m-dimensional method. These new control parameters might be determined one after the other or simultaneously. In our example step 1302 calculates the new cluster distance parameter $P_{cd-1}$ for the one-dimensional case. Remember that according to (1) the new parameter $P_{cd-1}$ for the one-dimensional method generally may depend on $P_{cd-2}$ control parameter for 2-dimensional algorithm $D_n$ data in n-dimensional space (how original data is distributed)

T transformation function for dimension reduction (resolution and anomalies of Hilbert curve)

n, m source (n) and target (m) dimension of the data spaces

Step 1302 is described in more detail in FIG. 15: In some situations we already know how to derive the new value of the control parameters by means of a formula or by a lookup in a pre-defined table. In this case the decision in 1501 will result in "Yes" and step 1302 is completed. We will give an example for this further below.

For our example we do not have a formula or pre-calculated table values, so the result of decision 1501 is "No". This leads to the point 1502 where we choose some sample data from the original two-dimensional space that we use to derive the new value for control parameter $P_{cd-1}$. In a further embodiment we start with a random data point "A" (909 in FIG. 9) in two-dimensional space, and seek for a data point "B" (910) in two-dimensional space so that the distance between "A" and "B" is below the threshold value of parameter $P_{cd-2}$ in two-dimensional space. Then we take another random data point "C" (911) in two-dimensional space and seek for a data point "D" (912) in two-dimensional space so that the distance between "C" and "D" is above the threshold value of parameter $P_{cd-2}$ in two-dimensional space. This process is repeated to produce two groups of pairs of sample data. Group 1 contains pairs of sample data with distances smaller than $P_{cd-2}$, and group 2 contains pairs of sample data with distances larger than $P_{cd-2}$.

In a further embodiment, as an alternative for seeking data points existing in two-dimensional space with the desired property, such data points ("B" and "D") are constructed and used as if they were real. This is faster than seeking existing data points.

In another further embodiment, to increase accuracy with smaller sample sizes, the data points "B" and "D" are determined to be slightly above and slightly below the threshold value $P_{cd-2}$. In our example, we use a sample of seven pairs of data where $d_{xy}$ is (slightly) below the threshold and seven pairs where $d_{xy}$ is (slightly) above. In step 1503 these data points are transformed from two-dimensional space into one-dimensional space by means of a Hilbert space-filling curve.

As a result, we get the corresponding sample data points in one-dimensional space where we calculate the individual distances for each pair of data. In FIG. 17 the length of the arrows for each pair expresses the distances between points. The new threshold parameter $P_{cd-1}$ is derived and adjusted iteratively in the following way:

a. Split sample data pairs in one-dimensional space into two groups: group 1 in 1701 that contains only data pairs where the distance in two-dimensional space was below the threshold $P_{cd-2}$ and group 2 in 1702 that contains only pairs where the distance in two-dimensional space was above the threshold $P_{cd-2}$.

b. Then in group 1 find the pair with maximum distance (dg1max 1703). In a similar way find the pair in group 2 with minimum distance (dg2min 1704).

We hope that dg1max is less than dg2min in which case we derive $P_{cd-1}$ by $$P_{cd-1} = (dg1\text{max} + dg2\text{min})/2 \qquad (2)$$

c. Unfortunately, due to anomalies of data transformation it is possible that dg2min is less than dg1max as shown in FIG. 17. Here data pair 9 (1705) of group 1 has a distance that is larger than the distance of data pair 8 (1706) in group 2. FIG. 10 shows a data transformation by means of Hilbert space-filling curve 1001 from two-dimensional space 1002 to one dimension 1003. In two-dimensional space the pair of data points 1004 and 1005 has the distance D. The Hilbert transformation function maps this pair of data to the new pair of data 1006 and 1007 in one dimension with the distance D'. The pair 1008 and 1009 has distance d<D. Through Hilbert transformation we obtain data points 1010 and 1011 with distance d'. In contrast to the relation in two-dimensional space where we had d<D, we now have d'>D'. If $P_{cd-2}$ is between d and D, then we have the situation of FIG. 17 where dg1max>dg2min.

d. For a given $P_{cd-1}$ we define the error rate as the number of pairs in group 1 with a distance larger than $P_{cd-1}$ plus the number of pairs in group 2 with a distance smaller than $P_{cd-1}$ divided by number of all data pairs. If dg1max>dg2min then the error rate is not zero.

In this case we proceed in the following way:

In an optimization step 1504 we define $P_{cd-1}$ between dg2min and dg1max such that the number of sample pairs on the "wrong" side of $P_{cd-1}$ is minimal. This can simply be done by computing the error rate for all potential values of $P_{cd-1}$ between dg2min and dg1max and selecting the value with the smallest error rate. In a preferred embodiment potential values are calculated as follows:

1. Select pairs with distance between dg2min and dg1max
2. Sort distances of these pairs as $d_i$
3. Potential values are $(d_i + d_{i+1})/2$ e. This ends (1505) the parameter adaptation step 1302 in FIG. 13. Test 1303 compares the error rate with a predefined maximal error. If the error is too large (case 1304) the procedure in FIG. 13 is started again with the selection of a different transformation function.

In our chosen example of Hilbert space-filling curve to transform data from two-dimensional space to one dimension we can show a situation where selecting a different, i.e. alternative transformation is the only way to end up with an acceptable error rate. Generally such an alternative transformation $T_{alt}$ may be based on the same class of space-filling curves than the transformation function T (for instance both may be based on Hilbert space-filling curves) or the alternative transformation function $T_{alt}$ may be based on another class of space-filling curves than the transformation function T (for instance one may be based on a Hilbert space-filling curve while the other may be based on a Peano space-filling curve).

Let's assume a distribution of data points in two-dimensional space as shown in FIG. 18. There is a strong aggregation of eleven data points that form a cluster 1802 and two other data points that form a cluster 1803. Transforming all data points by means of the Hilbert space-filling curve 1801 to one dimension leads to four individual clusters 1804, 1805, 1806 and 1807. Even worse, the original data points of cluster 1803 are now between the new clusters 1805 and 1806 that belong to the original cluster 1802. Although locality is preserved by space-filling curves in a macroscopic sense, it is not always guaranteed when we look into a microscopic area. So, in this example the adaptation of $P_{cd-2}$ to $P_{cd-1}$ as previously described could result in an error rate that might be unacceptable.

In a further embodiment of the current invention a new curve (i.e. an alternative transformation) is constructed by varying some properties of the previously selected one. In our example, we modify the transformation function such that it is shifted in one dimension by a certain amount, for example $$S_{shift} = P_{cd-2} \quad (3)$$

in an arbitrary dimension. This assures, that the original clusters in two-dimensional space are "moved" away from a critical section of space-filling curve where locality is not preserved. In a further preferred embodiment the space-filling curve is "rotated" by 90 degree in an arbitrary direction, or a different space-filling curve such as a Peano curve is selected, or a totally different type of transformation function is employed. Then step 1302 in FIG. 13 is performed again until decision 1303 results in a "Yes".

Proceeding with our example we modify a property of our Hilbert space-filling curve such that it is "shifted" in one dimension as shown in 1901 in FIG. 19. The shift-distance is the value of $P_{cd-2}$. FIG. 19 shows that the curve is still contiguous and all points of the space are reached, but now in a different order. As we "moved out" the original cluster 1902 from the critical area of space-filling curve where locality is not preserved we end up with only two new "clusters" 1904 and 1905 in one dimension, so that the error rate in test 1303 is now acceptable.

Although the desired goal is to gain performance, there is always a trade-off with error rate that has to stay within an acceptable limit. But all these computations are only performed on a data sample and the run time does not therefore increase with the total number of data records.

We exit with "Yes" and apply the actual transformation function to all input data (1305). Then the data-mining model is computed using the one-dimensional algorithm (1306).

Optionally, the results are retranslated and presented in terms of n dimensions (1307). Any one-dimensional result property, such as the variance of data in a cluster (often used to describe the homogeneity of a cluster) must be presented as a value in the realm of the original data. In many cases, it is possible to exploit geometric properties to determine an approximation of such values. In the example of a cluster variance, remapping a sample set of cluster members into n dimensions will give a statistically sound estimate of the actual (n-dimensional) cluster variance (see FIG. 14).

4.4 Solution Concept Applied to a Classification Problem

As a second example of the preferred embodiment we deal with the decision tree classification algorithm. In this case the control parameter is the maximum depth to which the decision tree is allowed to be expanded. We describe how this parameter is adapted in step 1302 of FIG. 13. This is an example of the case where the decision 1501 in FIG. 15 results in "Yes".

FIG. 16 depicts the classification error rate as a function of tree depth for various data dimensions. The curves were derived as average values from tests using models generated earlier for comparable data mining problems. Line 1601 shows how the error rate decreases with increasing tree depth for 10-dimensional problems, whereas line 1602 shows the same dependency for five dimensions. Point 1603 indicates the user's parameter for a 10-dimensional problem, which—for similar problems—has led to 14% error. The x-value of the intersection 1604 of a horizontal line with the curve 1602 for reduced dimensionality determines a value for the maximal tree depth parameter that is likely to produce a model with a similar error rate. The exact value of the error rate depends on the actual data set, of course. For small changes, this is not relevant, however, as it is likely that both curves will shift to the same direction.

Again, this shows the need and the benefit of also transforming the control parameter when reducing the dimensions of apparent data spaces.

The invention claimed is:

1. A computerized data mining method performed by a processor that analyzes a multitude of items in an n-dimensional space $D_n$, each described by n item features, said method using a mining function f with at least one control parameter $P^i$ controlling a target feature of the data mining function, said method comprising:
   a first step of selecting a transformation function T to reduce dimensions of said n-dimensional space by space-filling curves mapping said n-dimensional space to a in-dimensional space;
   a second step of determining a transformed control parameter $P^T{}_i$ controlling the target feature of the data mining function in said m-dimensional space, wherein the m-dimensional space comprises fewer dimensions that the n-dimensional space and wherein the transformation function T ensures that all information within the n-dimensional space is mapped onto and maintained in the m-dimensional data space;
   a third step of applying said selected transformation function T on said multitude $D_n$ of items to create a transformed multitude $D_m$ of items and executing said mining function f controlled by said transformed control parameter $P^T{}_i$ on said transformed multitude of items $D_m$; and
   a fourth step of storing a result of the third step in memory.

2. The computerized data mining method according to claim 1, wherein said transformed control parameter $P^T{}_i$ is determined additionally based on one or more of the following:
   the transformation function T;
   the multitude of items $D_n$;
   the number of dimensions n;
   the number of dimensions m;
   other control parameters $P_j$.

3. The computerized data mining method according to claim 1, wherein said second step of determining said transformed control parameter $P^T{}_i$ comprises the following sub-steps:
   choosing a set of sample items of said n-dimensional space;

applying said selected transformation function T on said set of sample items to create a transformed set of sample items; and determining said transformed control parameter $P^T_i$ such that an acceptable target of the data mining function in said m-dimensional space is achieved with respect to said transformed set of sample items.

4. The computerized data mining method according to claim 3, wherein said set of sample items is created by selecting items from said multitude of items $D_n$; or is created by creating artificial items within said n-dimensional space.

5. The computerized data mining method according to claim 1, wherein responsive to a failure to determine a satisfactory transformed control parameter $P^T_i$ in said second step, said method is iterated with said first step by selecting an alternative transformation function $T_{alt}$ instead of said transformation function T.

6. The computerized data mining method according to claim 5, wherein said alternative transformation function $T_{alt}$ is being based on the same class of space-filling curves as said transformation function T, or wherein said alternative transformation function $T_{alt}$ is being based on another class of space-filling curves than said transformation function T.

7. The computerized data mining method according to claim 6, wherein said same class of space-filling curves is the class of Hilbert space-filling curves.

8. The computerized data mining method according to claim 1, wherein in said second step said transformed control parameter $P^T_i$ is determined for at least one comparable data mining problem using empirical data from previously generated data models.

9. The computerized data mining method according to claim 1, wherein said mining function is solving a clustering problem and said control parameter $P_i$ and transformed control parameter $P^T_i$ is a minimal distance between clusters, or wherein said mining function is solving a classification problem and said control parameter $P_i$ and transformed control parameter $P^T_i$ is a maximum depth of a classification decision tree.

10. The computerized data mining method according to claim 1, wherein said method comprising a fifth step of presenting data mining results determined within said m-dimensional space in terms of said n-dimensional space.

11. The computerized data mining method according to claim 1, wherein said m-dimensional space is reduced to one dimension (m=1) only.

* * * * *